United States Patent Office 3,018,301
Patented Jan. 23, 1962

3,018,301
DITHIOPHOSPHONIC ACID AMIDES AND
PROCESS FOR THEIR PRODUCTION
Gerhard Schrader, Wuppertal-Cronenberg, Germany, assignor to Farbenfabriken Bayer Aktiengesellschaft, Leverkusen, Germany, a corporation of Germany
No Drawing. Filed Apr. 13, 1960, Ser. No. 21,880
Claims priority, application Germany Apr. 16, 1959
14 Claims. (Cl. 260—461)

The present invention relates to and has as its objects new and useful dithiophosphonic acid-ester-amides and processes for their production. The new compounds, which are highly effective insecticides, may be represented by the following general formula

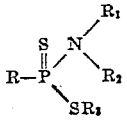

in which R, $R_1$ and $R_2$ stand for aliphatic radicals and $R_3$ stands for optionally substituted aliphatic radicals.

Alkyl-thionophosphonic acid amide chlorides have recently become known in the literature (cf. B. A. Arbusow, N. I. Rizpolozhenski and N. A. Svereva, Izvest. Akad. Nauk SSSR (1955) 1021–1030). According to fundamentally known processes, these chlorides or, in general, halides of this type may be reacted with alkali metal hydrogen sulfides in such a manner that the corresponding salts of alkyl-dithiophosphonic acid-amides are formed. The following equation may illustrate this reaction:

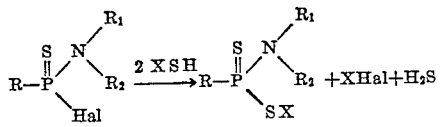

In the above formulae R more specifically stands for a lower alkyl or cycloalkyl radical, $R_1$ and $R_2$ are preferably also lower alkyl radicals, but may also be cyclically linked with one another to form an N-containing heterocyclic ring system. Hal preferably stands for Cl or Br, and X is an alkali metal or $NH_4$.

By reaction of alkyl halides, which may be optionally substituted, with the aforesaid salts of alkyl-dithiophosphonic acid-amides, new esters of alkyl-dithiophosphonic acid-amides of highly insecticidal action are obtained which have not hitherto been described in the literature. The following reaction scheme may illustrate this process:

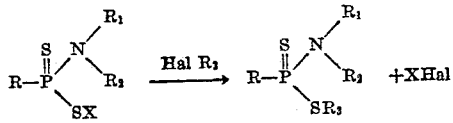

In the above formulae R, $R_1$, $R_2$, X and Hal have the above significance, and $R_3$ stands for an alkyl radical which may be substituted. The substitution of this alkyl radical $R_3$ more specifically may be of the following nature: aryl, especially phenyl groups (also possibly substituted), alkyl- or aryl-hydroxy or alkyl- or aryl-mercapto- or (di)alkyl- or aryl-amino groups (also optionally substituted), the cyano group, aryl- or alkyl-hydroxy carbonyl groups, aryl- or alkyl amino carbonyl groups, aryl- or alkyl carbonyl groups, aryl- or alkyl sulfoxyl- or -sulfonyl groups, another (di)(thio)phosphoric-, -phosphonic- or -phosphinic-acid derivative and a (di)(thio)-carbamic-(carbonic)acid derivative. The last groups of compounds being possibly linked to the alkyl group $R_3$ by another alkoxy- or alkyl-mercapto-group.

It is to be understood that instead of the aforementioned salts, the free acids may also be reacted with the optionally substituted alkyl halides in the presence of a suitable acid-binding agent.

The new compounds generally are obtained in good yields. They are distinguished by a good contact-insecticidal and ovicidal activity whilst having a comparatively low toxicity against warm-blooded animals.

As an example for the special utility of the present invention the compounds of the following formulae

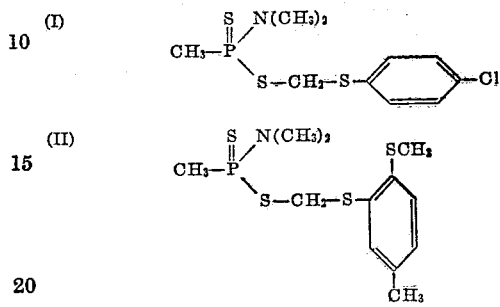

have been tested against aphids and spider mites. Aqueous dilutions of these compounds have been prepared by mixing the active ingredient with the same amount of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting at last this premixture with water to the desired concentration indicated in the following paragraphs.

The tests have been carried out as follows:

(a) Against aphids of the type *Doralis fabae*: heavily infested bean plants (*Vicia faba*) have been sprayed drip wet with solutions as prepared above in a concentration as shown below. The effect has been determined after 24 hours by counting the dead pests either on the surface of the soil or still remaining on the plants. The following results have been obtained:

| Compound | Aqueous concentration (in percent active ingredient/water) | Killing rate (in percent) |
|---|---|---|
| (I) | 0.1 | 100 |
| (II) | 0.1 | 100 |

(b) Against spider mites: bean plants (*Phaseolus vulgaris*) of about 15 inches height are sprayed drip wet with solutions prepared as indicated above and in a concentration as shown below. The bean plants have been infested heavily with the two-spotted spider (species *Tetranychus telarius*). Evaluation has been carried out after 24 hours, 48 hours and 8 days. The following results have been obtained:

| Compound | Aqueous concentration (in percent active ingredient/water) | Killing rate (in percent) |
|---|---|---|
| (I) | 0.001 | 100 |
| (II) | 0.001 | 100 |

The following examples are given for the purpose of illustrating the invention and show the great variety of the process claimed herein.

*Example 1*

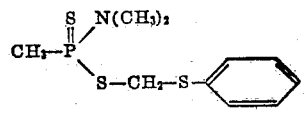

49 grams (0.25 mol) of the potassium salt of methyl-dithiophosphonic acid dimethyl amide are dissolved in 150 cc. of acetonitrile. 40 grams (0.25 mol) of α-chloromethyl-thiophenyl ether are added at 45° C. with stirring. Stirring is continued at 45° C. for an hour and the reaction product is subsequently poured into 300 cc. of ice water. The separated oil is taken up in 200 cc. of benzene, the benzene layer separated, washed neutral with water and dried. Upon removal of the solvent by vacuum distillation, 55 grams of the new ester are obtained as a water-insoluble, pale-yellow oil. Yield 79% of the theoretical. On rats per os toxicity 25 mg./kg. $LD_{50}$. Aphids are killed completely with 0.1% solutions. Spider mites are killed to 80% with 0.001% solutions.

By exactly the same way there may be obtained the following compounds:

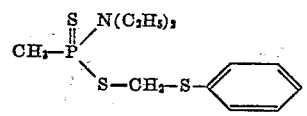

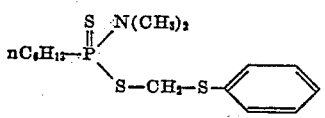

Example 2

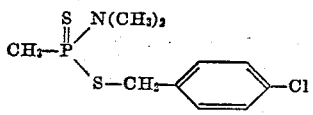

49 grams (0.25 mol) of the potassium salt of methyl-dithiophosphonic acid dimethyl amide are dissolved in 150 cc. of acetonitrile. 41 grams of p-chlorobenzyl chloride are added at 40° C. with stirring. The product is kept at 40–50° C. for an hour and then worked up as described in Example 1. 46 grams of the new ester of B.P. 118° C./0.01 mm. Hg are thus obtained. Yield 66% of the theoretical. On rats per os toxicity 100 mg./kg. $LD_{50}$. Aphids are killed completely with 0.01% solutions and spider mites are killed completely with 0.01% solutions.

By exactly the same way there may be obtained the following compound:

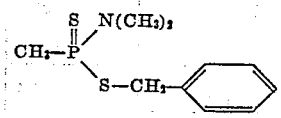

Example 3

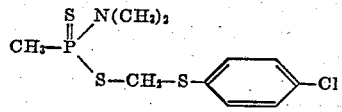

49 grams (0.25 mol) of the potassium salt of methyl-dithiophosphonic acid dimethyl amide are dissolved in 150 cc. of acetonitrile. 49 grams of α-chloromethyl-4-chlorophenyl thioether are added at 45° C. with stirring. The product is warmed to 50° C. for an hour and then worked up as described in Example 1. 57 grams of the new ester are obtained as a pale-yellow, water-insoluble oil. Yield 73% of the theoretical. On rats per os toxicity 100 mg./kg. $LD_{50}$. Aphids are killed completely with 0.1% solutions and spider mites are killed completely with 0.001% solutions.

Example 4

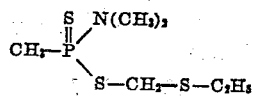

49 grams (0.25 mol) of the potassium salt of methyl-dithiophosphonic acid dimethyl amide are dissolved in 150 cc. of methyl ethyl ketone. 28 grams of α-chloromethyl-thioethyl ether are added at 50° C. with stirring. The product is kept at 50° C. for an hour and then worked up in usual manner. 34 grams of the new ester of B.P. 74° C./0.01 mm. Hg are obtained. Yield 60% of the theoretical. On rats per os toxicity 10 mg./kg. $LD_{50}$. Aphids are killed completely with 0.1% solutions and spider mites are killed to 80% with 0.001% solutions.

By exactly the same way there may be obtained the following compounds:

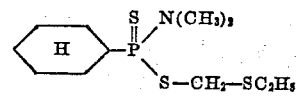

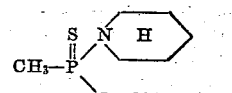

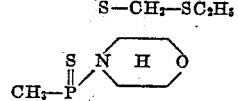

Example 5

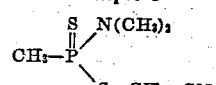

49 grams (0.25 mol) of the potassium salt of methyl-dithiophosphonic acid dimethyl amide are dissolved in 150 cc. of methyl ethyl ketone. 22 grams (0.25 mol) of α-chloroacetonitrile are added at 45° C. with stirring. The product is warmed to 50° C. for one hour and then worked up in usual manner. 35 grams of the new ester of B.P. 86° C./0.01 mm. Hg are thus obtained. Yield 72% of the theoretical. On rats per os toxcity 25 mg./kg. $LD_{50}$. Aphids are killed completely with 0.1% solutions and spider mites are killed completely with 0.01% solutions.

Example 6

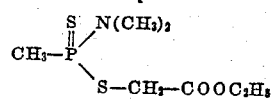

49 grams (0.25 mol) of the potassium salt of methyl-dithio-phosphonic acid dimethyl amide are dissolved in 150 cc. of acetonitrile. 31 grams of chloroacetic acid ethyl ester are added at 45° C. with stirring. The product is warmed to 50° C. for an hour and then worked up in usual manner. 43 grams of the new ester of B.P. 78° C./0.01 mm. Hg are thus obtained. Yield 71% of the theoretical. On rats per os toxicity 500 mg./kg. $LD_{50}$. 0.1% solutions kill aphids to 60% and spider mites to 80%.

By exactly the same way there may be obtained the following compound:

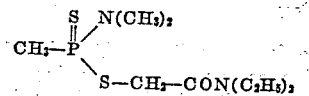

Example 7

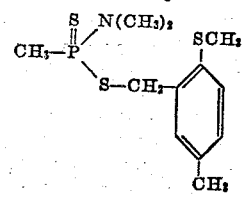

49 grams (0.25 mol) of the potassium salt of methyl-dithiophosphonic acid dimethyl amide are dissolved in 150 cc. of acetonitrile. 47 grams (0.25 mol) of 1-methyl-mercapto-4-methyl-6-benzyl chloride are added at 80° C. with stirring. Heating is continued at 80° C. for an hour and the product then worked up in usual manner. 64 grams of the new ester are thus obtained as a yellow, water-insoluble oil. Yield 84% of the theoretical. On rats per os toxicity 25 mg./kg. LD$_{50}$. Aphids are killed completely with 0.1% solutions and spider mites are killed completely with 0.001% solutions.

By exactly the same way there may be obtained the following compound:

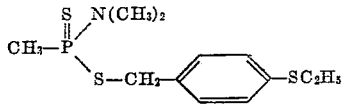

*Example 8*

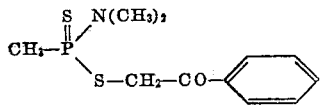

49 grams (0.25 mol) of the potassium salt of methyldithiophosphonic acid dimethyl amide are dissolved in 150 cc. of acetonitrile. 39 grams of ω-chloro-acetophenone, dissolved in 50 cc. of acetonitrile, are then added at 45° C. with stirring. The temperature is kept at 50° C. for one hour and the product then worked in usual manner. 40 grams of the new ester are obtained as a water-insoluble, yellow oil. Yield 58% of the theoretical. On rats per os toxicity 50 mg./kg. LD$_{50}$. Aphids are killed completely with 0.1% solutions and spider mites are killed to 90% with 0.01% solutions.

By the same way there may be obtained the following compound:

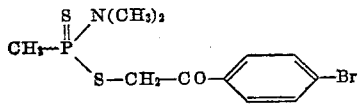

*Example 9*

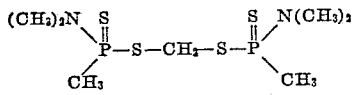

78 grams (2/5 mol) of the potassium salt of methyldithiophosphonic acid dimethyl amide are dissolved in 150 cc. of acetonitrile. 35 grams (0.20 mol) of methylene bromide are added at 80° C. with stirring. The product is kept at 80° C. for two hours and then worked up in usual manner. 32 grams of the new ester are obtained as a water-insoluble pale-yellow oil. Yield 50% of the theoretical. On rats per os toxicity 25 mg./kg. LD$_{50}$. Aphids are killed completely with 0.1% solutions and spider mites are killed completely with 0.0001% solutions.

*Example 10*

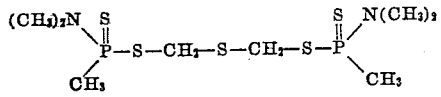

78 grams (2/5 mol) of the potassium salt of methyldithiophosphonic acid dimethyl amide are dissolved in 150 cc. of acetonitrile. 27 grams (1/5 mol) of α,α'-dichloromethylthioether are added at 80° C. with stirring. The temperature is kept at 80° C. for an hour and the product is then worked up in usual manner. 32 grams of the new ester are thus obtained as a pale-yellow, water-insoluble oil. Yield 44% of the theoretical. On rats per os toxicity 25 mg./kg. LD$_{50}$. Aphids are killed to 50% with 0.1% solutions and spider mites are killed completely with 0.01% solutions.

*Example 11*

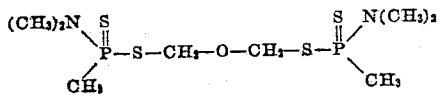

98 grams (0.5 mol) of the potassium salt of methyldithiophosphonic acid dimethyl amide are dissolved in 200 cc. of acetonitrile. 29 grams of α,α'-dichloromethyl ether are added at 60° C. with stirring. The temperature is kept at 60° C. for a further hour and the product then worked up in usual manner. 58 grams of the new ester are thus obtained as a water-insoluble, pale-yellow oil. Yield 66% of the theoretical. On rats per os toxicity 5 mg./kg. LD$_{50}$. 0.1% solutions kill aphids to 90% and spider mites are killed to 100% with 0.01% solutions.

*Example 12*

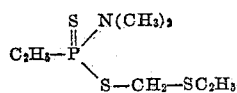

52 grams (0.25 mol) of the potassium salt of ethyldithiophosphonic acid dimethyl amide are dissolved in 150 cc. of acetonitrile. 28 grams of α-chloromethyl-thioethyl ether are added at 45° C. with stirring. The product is kept at 50° C. for a further hour and then worked up in usual manner. 43 grams of the new ester of B.P. 80° C./0.01 mm. Hg are thus obtained. Yield 71% of the theoretical 0.01% solutions kill aphids to 100% and spider mites to 90%.

In a similar manner the following compounds may be obtained:

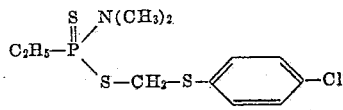

water-insoluble pale-yellow oil yield 82% of the theoretical

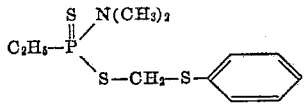

water-insoluble pale-yellow oil yield 76% of the theoretical

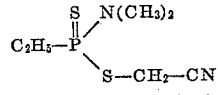

B.P. 92° C./0.01 mm. Hg yield 67% of the theoretical

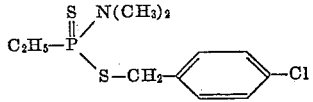

B.P. 128° C./0.01 mm. Hg yield 73% of the theoretical

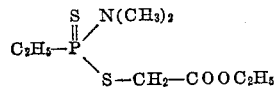

B.P. 84° C./0.01 mm. Hg yield 82% of the theoretical

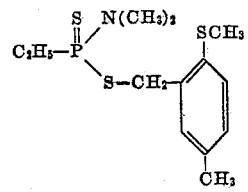

water-insoluble, yellow oil yield 83% of the theoretical

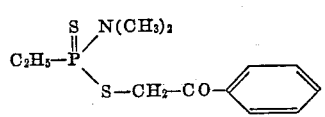

water-insoluble, pale-yellow oil yield 78% of the theoretical

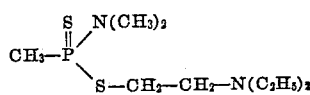

B.P. 87° C./0.01 mm. Hg yield 74% of the theoretical

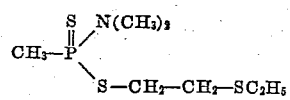

B.P. 83° C./0.01 mm. Hg yield 79% of the theoretical

Example 13

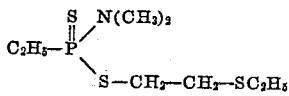

52 grams (0.25 mol) of the potassium salt of ethyl-dithiophosphonic acid dimethyl amide are dissolved in 150 cc. of acetonitrile. 32 grams (0.25 mol) of β-chloro-ethyl-thioethyl ether are added at 80° C. with stirring. The temperature is kept at 80° C. for an hour and the product is then worked up in usual manner. 47 grams of the new ester of B.P. 91° C./0.01 mm. Hg are thus obtained. Yield 73% of the theoretical. Aphids are killed completely with 0.1% solutions. Spider mites are killed to 70% with 0.001% solutions.

Example 14

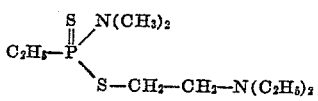

52 grams (0.25 mol) of the potassium salt of ethyl-dithiophosphonic acid dimethyl amide are dissolved in 150 cc. of acetonitrile. 35 grams of β-chloroethyl-diethyl amine are added at 80° C. with stirring. The product is kept at 80° C. for an hour and then worked up in usual manner. 40 grams of the new ester of B.P. 92° C./0.01 mm. Hg are thus obtained. Yield 60% of the theoretical. Aphids are killed completely with 0.1% solutions and spider mites are killed completely with 0.01% solutions.

In a similar manner the following compounds are obtained:

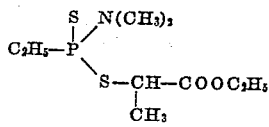

B.P. 92° C./0.01 mm. Hg yield 73% of the theoretical

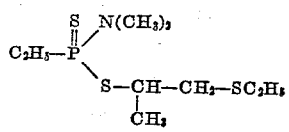

B.P. 98° C./0.01 mm. Hg yield 70% of the theoretical

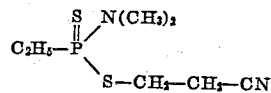

B.P. 106° C./0.01 mm. Hg 69% of the theoretical

I claim:
1. The compound of the following formula

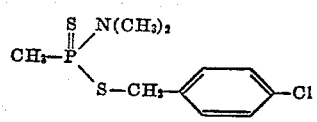

2. The compound of the following formula

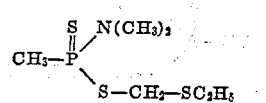

3. The compound of the following formula

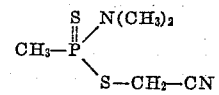

4. The compound of the following formula

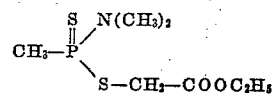

5. The compound of the following formula

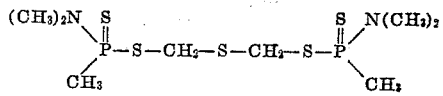

6. The compound of the following formula

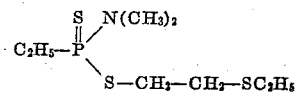

7. The compound of the following formula

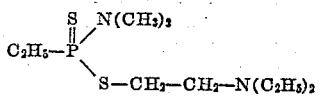

8. A dithiophosphonic acid ester amide of the following general formula

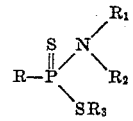

in which R stands for a member selected from the group consisting of lower alkyl and cyclohexyl radicals, $R_1$ and $R_2$ each stand for lower alkyl radicals and when taken together with —N< stand for a member selected from the group consisting of piperidino and morpholino; and $R_3$ stands for a member selected from the group consisting of a phenyl-mercapto-substituted lower alkyl radical, a lower alkyl-mercapto-substituted lower alkyl radical, a lower dialkyl-amino-substituted lower alkyl radical, a lower alkoxy carbonyl-substituted lower alkyl radical, a lower dialkyl amino-carbonyl-substituted lower alkyl radical, a cyano-substituted lower alkyl radical, a phenyl-carbonyl-substituted lower alkyl radical, benzyl, chloro-substituted benzyl, lower alkyl-mercapto-substituted benzyl, lower alkyl-mercapto-substituted- lower alkyl-substituted benzyl, another

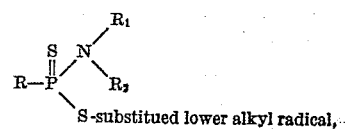

another

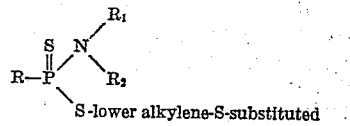

lower alkylene radical and another

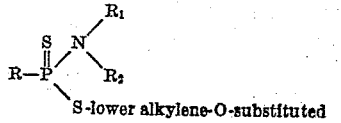

lower alkylene radical.

9. A compound of claim 8 wherein R, $R_1$ and $R_2$ each stand for a lower alkyl radical and $R_3$ stands for a phenyl-mercapto-substituted lower alkyl radical.

10. A compound of claim 8 wherein R, $R_1$ and $R_2$ each stand for a lower alkyl radical and $R_3$ stands for a lower alkyl-mercapto lower alkyl radical.

11. A compound of claim 8 wherein R, $R_1$ and $R_2$ each stand for a lower alkyl radical and $R_3$ stands for a cyano lower alkyl radical.

12. A compound of claim 8 wherein R, $R_1$ and $R_2$ each stand for a lower alkyl radical and $R_3$ stands for a lower alkoxy carbonyl-substituted lower alkyl radical.

13. A compound of claim 8 wherein R, $R_1$ and $R_2$ each stand for a lower alkyl radical and $R_3$ stands for a lower dialkyl-amino lower alkyl radical.

14. A compound of the following formula

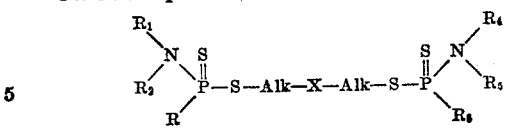

in which R, $R_1$, $R_2$, $R_4$ and $R_5$ are each a lower alkyl radical and X stands for a chalcogen having an atomic weight from 16 to 33.

No references cited.